June 2, 1964 R. L. REID 3,135,466
MEANS FOR LIFTING MOISTURE FROM A BODY OF WATER
Filed Nov. 10, 1960

INVENTOR.
Robert L. Reid
BY 3,135,466
MEANS FOR LIFTING MOISTURE FROM
A BODY OF WATER
Robert L. Reid, 2705 13th St. NW., Apt. 242,
Washington 18, D.C.
Filed Nov. 10, 1960, Ser. No. 68,442
3 Claims. (Cl. 239—14)

This invention relates to a method and means for lifting moisture from a body of water whereby certain important and useful effects or advantages can be achieved.

The primary object of this invention is to provide a method and means whereby moisture can be lifted from a body of water so that for example sufficient moisture can be placed in the air in order to cause the precipitation or rain to occur so that an effective weather control means is provided.

Another object of the invention is to provide a means whereby moisture can be lifted up out of a body of water so that weather conditions can be controlled as for example sufficient moisture can be placed in the air in order to control wind currents as well as wind direction since the moisture may be placed in a particular location in order to achieve the desired control of the weather, and wherein in certain instances the principals of the present invention are applicable to camouflage purposes so that the present invention lends itself to military as well as peaceful uses.

Still another object of the invention is to provide such a means for lifting moisture from a body of water, wherein the means of the present invention is economical to operate or carry out, and which is efficient in operation and foolproof in use.

These and other objects of the invention will become apparent from a reading of the following specification and claims together with the accompanying drawing, wherein like parts are referred to and indicated by like reference characters and wherein:

Figure 1:
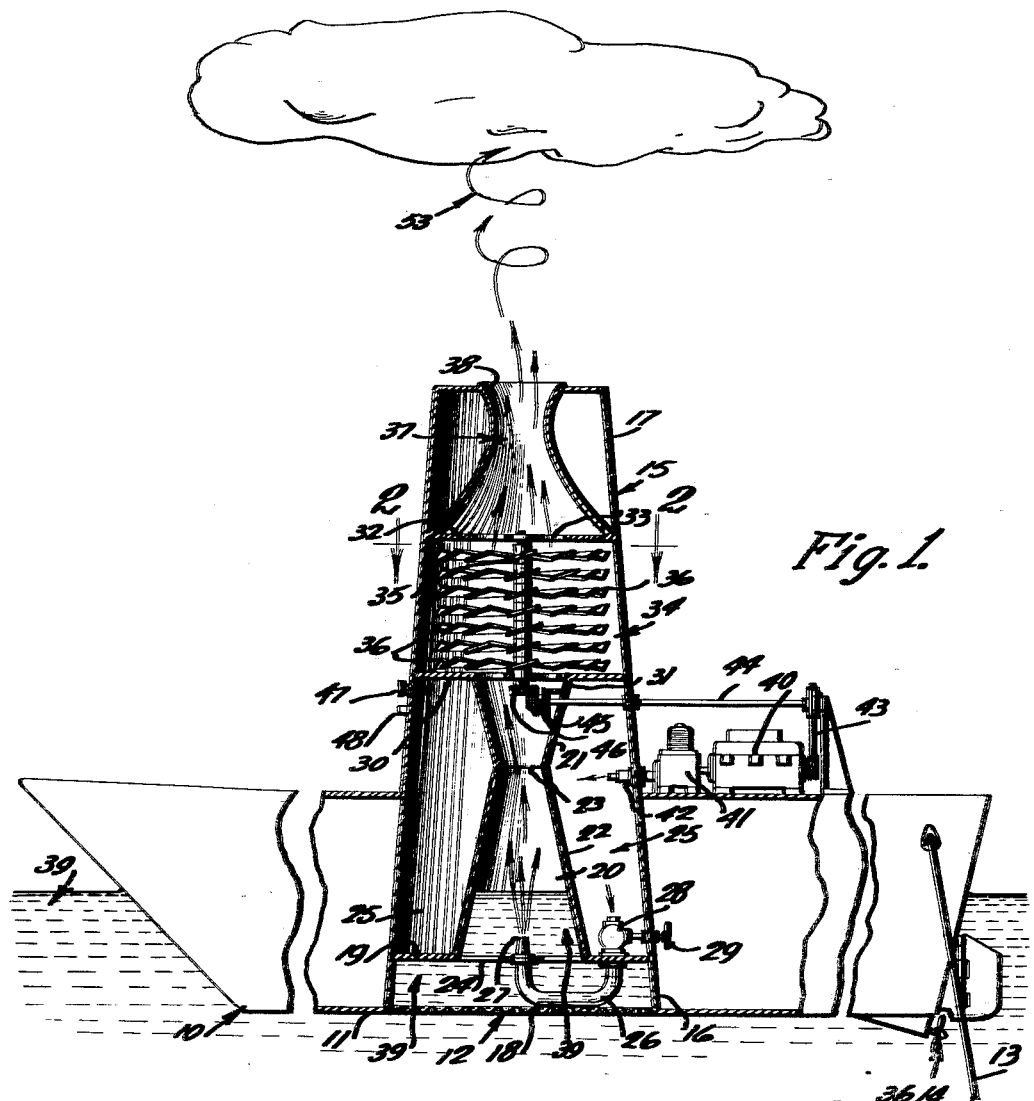
FIGURE 1 is an elevational view of an embodiment of the present invention, with parts broken away and in section.

Referring in detail to the drawings, the numeral 10 indicates a buoyant member which may be a barge, floating vessel, ship, boat or the like, and wherein there is provided in the bottom 11 of the buoyant member 10 an opening 12 for a purpose to be later described. The numeral 13 indicates a cable which is adapted to be connected to an anchor for the buoyant member 10, FIGURE 1, and a suitable propelling means 14 may be provided for the member 10.

The numeral 15 indicates a hollow housing which is generally vertically disposed, and the housing 15 has a frustro-conical shape, and wherein the lower portion of the housing 15 as indicated by the numeral 16 is of greater cross sectional area than the upper portion thereof as indicated by the numeral 17. The numeral 18 indicates a reticulated member or screen which is mounted in the bottom of the housing 15 in the vicinity of the opening 12 so that foreign matter, debris, or the like will be kept from entering the mechanism of the present invention.

Mounted in the lower portion of the housing 15 is a horizontally disposed platform 19, and the numeral 20 indicates a hollow casing which may be supported on the platform 19, and as shown in the drawings the casing 20 includes upper and lower frustro-conical sections 21 and 22 which have their portions of smallest cross sectional area contiguous or adjacent each other so as to define a restricted throat as indicated by the numeral 23. The lower end of the casing 20 is open as indicated by the numeral 24. The numeral 25 indicates a compressed air chamber which is defined between the casing 20 and housing 15.

The numeral 26 indicates a conduit which has one end communicating with the compressed air chamber 25, and there is provided on the other end of the conduit 26 a discharge head or fitting 27 which is arranged in the lower portion of the casing 20, as shown in FIGURE 1. A control valve 28 is connected to the conduit 26, and the control valve 28 may be operated by means of a handle member 29 which can be arranged in any suitable location.

Mounted above the casing 20 is a horizontally disposed plate 30 which is provided with a central cut away portion or opening 31, and a horizontally disposed plate 32 is arranged in spaced parallel relation above the plate 30, the plate 32 having a central cut away or open portion 33. The numeral 34 indicates a fan which embodies a vertically disposed driven shaft 35 that extends between the plates 30 and 32, and a plurality of rotary blades or vanes 36 are suitably affixed to the shaft 35.

There is mounted in the upper end of the housing 15 a nozzle 37, and the nozzle 37 is provided with a restricted throat, and the upper end of the nozzle 37 is open as indicated by the numeral 38.

The numeral 39 indicates the water, and this water 39 is adapted to be acted upon in such a manner that moisture is lifted up from the water and dispelled into the atmosphere to accomplish the desired effects or results.

The numeral 40 indicates a conventional power mechanism such as an engine, motor or the like, and the engine 40 serves to operate an air compressor 41 which is adapted to supply compressed air into the chamber 25 through a pipe or conduit 42. The numeral 44 indicates a drive shaft which is adapted to be operated from the engine 40 in a suitable manner, as for example by means of chain or belt drive 43, and the drive shaft 44 serves to rotate the driven shaft 35 through the medium of intermeshing bevel gears 45 and 46. The numeral 47 indicates a pressure gage and the numeral 48 indicates a pressure release valve for the chamber 25.

Figure 3:
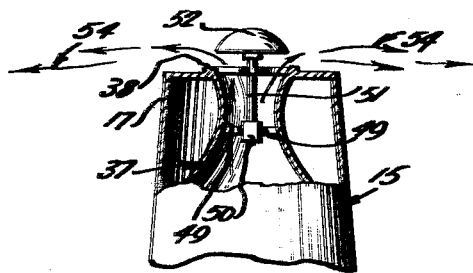
FIGURE 3 is a fragmentary sectional view illustrating a modification.
Figure 2:
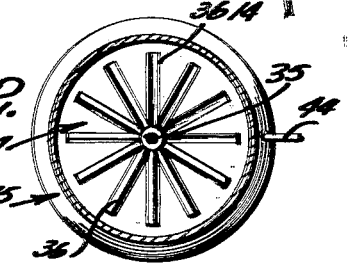
FIGURE 2 is a sectional view taken on the line 2—2 of FIGURE 1.

Referring now to FIGURE 3 of the drawing, there is illustrated a modification wherein the numeral 49 indicates the horizontally braces which are adapted to be suitably secured in the nozzle 37, and a support member 50 is connected to the braces 49, there being a vertically disposed rod 51 supported by the member 50. The numeral 52 indicates a deflector which is affixed to the upper end of the rod 51.

From the foregoing, it is apparent that there has been provided a method and means for lifting moisture from a body of water such as the water 39 so that a mist or quantity of moisture as indicated by the numeral 53 can be dispensed into the air for various beneficial purposes. As shown in FIGURE 3 by using a deflector such as the deflector 52, a fog like quantity of moisture 54 may be caused to travel in a generally horizontal direction close to the ground so that by using the deflector 52 the direction or path of the moisture 54 can be readily regulated or controlled as desired.

With the parts arranged as shown in the drawings, it will be seen that the member 10 which may be a boat, barge, or the like is adapted to be towed or operated along a body of water 39 which may be a river, ocean, lake or any other suitable body of water, and the member 10 may be provided with various types of accessories such as the propeller 14, and the anchor chain 13, as well as a suitable engine for driving the same, and there is provided in the bottom of the buoyant member 10 an opening 12 which is covered over by a screen or reticulated member 18. Then, with the member 10 in the body of the water 39 as shown in FIGURE 1, it will be seen that the water 39 will rise through the opening 12 into the lower end of the casing 20 through the opening 24 and the partition 19 since water will seek its own level and the level of water in the casing 20 will be the same as the level of the body of water 39 in which the member 10 is being used.

By suitably actuating or operating the motor 40, the air compressor 41 will be driven so that the compressed air from the conduit 42 will be discharged into the chamber 25, and by opening the valve 28 by means of the handle 29, this compressed air from the chamber 25 will flow from the chamber 25 through the conduit 26 and the compressed air will be discharged upwardly through the discharge outlet or head 27 below the level of water in the casing 20. As the compressed air issues into the water, the compressed air will rise in the water and will carry some of the moisture upwardly therewith, and this air and water will then travel upwardly through the casing 20 through the restricted throat 23 and due to the provision of the restricted throat 23, the velocity of the air and water will be increased as for example in accordance with Bernoulli's effect, and this air and water will then pass upwardly through the openings 31 in the plate 30 and will be acted on by the revolving blades 36 of the fan 34. The revolving blades 36 will have a tendency to help atomize the moisture and this moisture will then flow upwardly through the openings 33 in the plate 32 and will then flow through the nozzle 37 which has the restricted throat, and this material will then be discharged into the atmosphere through the openings 38, and the numeral 53 indicating in FIGURE 1 generally the mist or moisture being discharged into the atmosphere.

The shaft 35 of the fan 34 has the bevel gear 46 on its lower end which meshes with the bevel gear 45 on the inner end of the rod 44, and the rod 44 is driven from the engine 40 by means of the chain or belt drive 43 so that the power mechanism 40 not only provides the means for supplying compressed air through the chamber 25 but also provides a means for operating the fan 34.

With the parts arranged as shown in FIGURE 1, the mist 53 will be directed in a generally upward direction, and with the parts arranged as shown in FIGURE 3, as the mist or moisture travels upwardly through the nozzle 37, it will engage the bottom of the deflector 52 so that this moisture will be deflected laterally or outwardly instead of upwardly as indicated by the numeral 54, and the deflector 52 may be supported on a rod 51, and the lower end of the rod 51 may be suitably secured to a member 50 that is affixed to arms or braces 49.

The parts can be made of any suitable material and in different shapes or sizes.

By means of the present invention, moisture such as the moisture 53 can be introduced into the air as a spray or mist so that for example rain clouds can be provided or formed, and the moisture may be introduced into the air in the form of a fine spray. By introducing the moisture into the air certain beneficial effects in connection with weather control can be effected as for example the present invention can be used to help lift fog, and air currents can be induced which will become self-acting or automatic.

In addition the present invention can be used as an effective means of desalination of sea water through the artificial production and control of certain weather conditions. Sea water vaporized under pressure and forced into the atmosphere rises rapidly forming into clouds and moisture thus placed into the atmosphere acts to speed-up the rain process that is found in nature.

The present invention functions in much the same manner as a water spout where sea water is forced into the atmosphere and returns to the surface in the form of rain. The quality of rainfall or fresh water desired will determine the quantity of water to be placed into the atmosphere and with the present invention it is possible to produce an air mass of high pressure and also control the wind direction and speed within that air mass and such an air mass produced offshore will by virtue of its higher pressure, pass over land areas of lower pressure so as to yield rainfall or fresh water. The present invention can be operated from self-propelled barges.

By using the present invention to desalt sea water, certain important benefits to barren areas can be brought about and irrigation water can be supplied so that wastelands, desert areas and the like can be revitalized since the desired or required amount of fresh water can be produced inexpensively and conveniently.

In addition the present invention can be used as means of minimizing or eliminating smog, and inasmuch as smog is believed to consist of particles suspended in the air, by adding additional moisture, the particles can be caused to settle out of the air in order to eliminate the smog, and also, dust storms can be controlled with the present invention. The member 10 may be made large enough so that persons may sleep, eat and otherwise remain thereon for protracted periods of time in a comfortable and convenient manner. In addition more than one of the moisture lifting mechanisms of the present invention may be provided on a single buoyant member 10.

An important aspect or feature of the present invention is the concept of getting sufficient moisture in the air to cause precipitation or rain, and in addition the present invention also provides a method of controlling weather since wind current and wind direction can be controlled in order to direct the moisture in a particular location, and the present invention also provides an improved method of camouflage since as shown in FIGURE 3 for example the moisture 54 can be directed in a generally horizontal plane in order to help camouflage troop movements or the like. With further reference to FIGURE 1 the air being discharged at the point 27 enters the water below the level of the water and then the air and water move upwardly through the throat 23 where the material is speeded up in velocity, and the blades 36 help break up the moisture into a mist. With the present invention the natural process of evaporation is speeded up and the moisture will be placed in the atmosphere or air in large quantities and will be broken up into small droplets or in the form of a mist, and the device will work in different temperature conditions as for example it will work in winter, summer or the like. The device is simple and economical to use, and it will be useful in cultivation as in dry areas, and the present invention provides a weather control means as well as a desalting process. The fresh water will return to the earth in the form of rain, since the moisture discharged into the atmosphere as a mist will form clouds rapidly and also, the present invention can be used to artificially create a high pressure system of air masses and by arranging the high and low masses at desired points, air currents can be set up to readily control storms or the like.

Minor changes in shape, size and rearrangement of details coming within the field of invention claimed may be resorted to in actual practice, if desired.

What is claimed is:

1. In a device of the character described, a buoyant member for use on a body of water, a hollow housing supported by said buoyant member and said hollow housing having a frustro-conical shape and wherein the lower portion of the housing is of greater cross sectional area than the upper portion thereof, the bottom of said housing being open, said buoyant member being apertured to establish communication between the body of water and housing, a reticulated member mounted in the bottom of said housing, a horizontally disposed platform mounted in the lower portion of said housing, a hollow casing supported by said platform, and said casing including upper and lower frustro-conical sections which have their portions of smallest cross sectional area adjacent each other so as to define a restricted throat, a compressed air chamber defined between said casing and housing, a conduit having one end communicating with said chamber and said conduit having an upwardly directed discharge head on its other end which is positioned in the lower portion of said casing, a control valve connected to said conduit, horizontally disposed apertured plates mounted in said housing above said casing, a fan including a vertically disposed driven shaft extending between said plates, drive means for said fan, a plurality of rotary blades affixed to said shaft, and a nozzle mounted in the upper portion of said housing above said fan, and said nozzle being provided with a restricted throat therein.

2. In a device of the character described, an apertured buoyant member, a hollow housing supported by said buoyant member and said hollow housing having a frustro-conical shape and wherein the lower portion of the housing is of greater cross sectional area than the upper portion thereof, the bottom of said housing being open, a reticulated member mounted in the bottom of said housing, a horizontally disposed platform mounted in the lower portion of said housing, a hollow casing supported by said platform, and said casing including upper and lower frustro-conical sections which have their portions of smallest cross sectional area adjacent each other so as to define a restricted throat, a compressed air chamber defined between said casing and housing, a conduit having one end communicating with said chamber and said conduit having an upwardly directed discharge head on its other end which is positioned in the lower portion of said casing, a control valve connected to said conduit, horizontally disposed apertured plates mounted in said housing above said casing, a fan including a vertically disposed driven shaft extending between said plates, a plurality of rotary blades affixed to said shaft, and a nozzle mounted in the upper portion of said housing above said fan, and said nozzle being provided with a restricted throat therein, a power mechanism on said buoyant member, a compressor driven by said power mechanism, conduit means connecting said compressor to said air chamber, and said compressor serving to supply compressed air to said chamber, a drive shaft operated by said power mechanism, and intermeshing bevel gears on said drive and driven shafts.

3. The structure as defined in claim 2 and further including braces mounted in said nozzle, a support member connected to said braces, a vertically disposed rod affixed to said support member, and a deflector connected to the upper end of said last named rod.

References Cited in the file of this patent

UNITED STATES PATENTS

| | | |
|---|---|---|
| 1,026,578 | Hammond | May 14, 1912 |
| 1,968,698 | Meyer | July 31, 1934 |
| 2,776,167 | Koch | Jan. 1, 1957 |
| 2,909,127 | Bradaska | Oct. 20, 1959 |

FOREIGN PATENTS

| | | |
|---|---|---|
| 941,487 | France | July 19, 1948 |